(12) United States Patent
Kitazawa

(10) Patent No.: US 8,161,735 B2
(45) Date of Patent: Apr. 24, 2012

(54) CLOGGING DETERMINING DEVICE FOR REDUCING AGENT PASSAGE AND CLOGGING DETERMINING METHOD FOR REDUCING AGENT PASSAGE

(75) Inventor: Eiichi Kitazawa, Saitama (JP)

(73) Assignee: Bosch Corporation, Tokyo (JP)

( * ) Notice: Subject to any disclaimer, the term of this patent is extended or adjusted under 35 U.S.C. 154(b) by 407 days.

(21) Appl. No.: 12/527,600

(22) PCT Filed: Feb. 18, 2008

(86) PCT No.: PCT/JP2008/052615
§ 371 (c)(1),
(2), (4) Date: Aug. 18, 2009

(87) PCT Pub. No.: WO2008/102719
PCT Pub. Date: Aug. 28, 2008

(65) Prior Publication Data
US 2010/0071349 A1    Mar. 25, 2010

(30) Foreign Application Priority Data
Feb. 19, 2007    (JP) .................................. 2007-038319

(51) Int. Cl.
*F01N 3/36*    (2006.01)

(52) U.S. Cl. ....................................................... 60/295

(58) Field of Classification Search .................... 60/295, 60/301, 303
See application file for complete search history.

(56) References Cited

U.S. PATENT DOCUMENTS
2002/0002964 A1    1/2002    Kohketsu et al.

FOREIGN PATENT DOCUMENTS
| JP | 2000161169 A | 6/2000 |
|---|---|---|
| JP | 2001518830 A | 10/2001 |
| JP | 200238928 A | 2/2002 |
| JP | 2002129945 A | 5/2002 |
| JP | 2002213231 A | 7/2002 |
| JP | 2006274856 A | 10/2006 |
| WO | 9843732 A1 | 10/1998 |

*Primary Examiner* — Thomas Denion
*Assistant Examiner* — Jonathan Matthias
(74) *Attorney, Agent, or Firm* — Ronald E. Greigg

(57) ABSTRACT

There are provided a clogging determining device for a reducing agent passage and a clogging determining method for a reducing agent passage, which can accurately detect clogging and estimate a clogged place when clogging occurs in any place of a supply line or a return line.

The device includes pump driving control element for subjecting the pump to DUTY control so that a pressure value is kept to a predetermined value, driving DUTY determining element for determining whether the driving DUTY of the pump is less than a predetermined threshold value corresponding to the opening degree of the reducing agent injection valve, or not; pressure reduction amount calculating element for calculating a pressure reduction amount by which the pressure value detected by the pressure sensor is reduced within a predetermined time after the pump is stopped and the reducing agent injection valve is fully opened when it is determined that the driving DUTY of the pump is less than the threshold value, and clogging determining element for determining on the basis of the pressure reduction amount calculated by the pressure reduction amount: calculating element whether clogging occurs in the first reducing agent passage or the second reducing agent passage.

9 Claims, 8 Drawing Sheets

US 8,161,735 B2

CLOGGING DETERMINING DEVICE FOR REDUCING AGENT PASSAGE AND CLOGGING DETERMINING METHOD FOR REDUCING AGENT PASSAGE

TECHNICAL FIELD

The present invention relates to a clogging determining device for a reducing agent passage and a clogging determining method for a reducing agent passage in an exhaust gas purification system. Particularly, the present invention relates to a clogging determining device for a passage and a clogging determining method for a reducing agent passage in an exhaust gas purification system having a return passage for keeping reducing agent under low temperature.

BACKGROUND ART

Oxides of nitrogen (hereinafter referred to as $NO_x$) which may risk the environment are contained in exhaust gas discharged from an internal combustion engine such as a diesel engine or the like. As an exhaust gas purification system used for purifying $NO_x$ there has been known an exhaust gas purification system (SCR system) for injecting and mixing urea solution as reducing agent into exhaust gas and selectively reducing and purifying $NO_x$ with catalyst.

Here, in the case where urea solution is used as reducing agent, hydrolysis occurs in the urea solution and thus it is crystallized when the urea solution is kept under a predetermined temperature range, so that clogging may occur in a reducing agent supply passage or an injection nozzle. Therefore, there has been disclosed a device and a method which use an injector 432 as means for supplying urea solution into an exhaust gas passage 420, and comprise means for supplying urea solution from a stock tank 430 through a line 431 into the injector 432, and means for returning the urea solution from the injector 432 to the stock tank 430 as shown in FIG. 8, whereby the urea solution is returned from the injector 432 to the stock tank 430 by a supply speed and a returning speed which are enough to keep the temperature of the urea solution sufficiently low, thereby reducing $NO_x$ exhaust (see Patent Document 1).

Patent Document 1: JP-T-2001-518830 (the whole text all figures).

DISCLOSURE OF THE INVENTION

Problem to be Solved by the Invention

Recently, the control of the cleanliness factor of exhaust gas has become severe, and it has been required to reduce the amount of $NO_x$ contained in exhaust gas to a smaller level than ever. In the exhaust gas purification system as described above, when clogging occurs in a reducing agent supply device, there is a risk that $NO_x$ in exhaust gas is not reduced and thus it is directly discharged to the atmosphere. Therefore, a method of accurately determining whether clogging occurs in the reducing agent supply device has been required.

In the device for reducing the $NO_x$ exhaust disclosed in the Patent Document 1, clogging hardly occurs due to hydrolysis of urea solution, however, the possibility that clogging occurs is not zero. Furthermore, clogging may occur not due to hydrolysis of urea solution, but due to soot or the like in exhaust gas. Accordingly, there has been required a method of accurately detecting clogging when the clogging occurs in the reducing agent supply device.

In a case where clogging occurs in a reducing agent supply line or a reducing agent return line, when it is unclear which line is clogged, it is eventually required to check each line or repair/exchange a clogged line, so that the efficiency may be lowered.

Therefore, the inventors of this invention have made an enthusiastic effort, and found that the above problem can be solved by detecting abnormality of driving DUTY of a pump and observing pressure variation in a supply line under a predetermined state in an exhaust gas purification system having a supply line and a return line. As a result, the present invention has been completed.

That is, an object of the present invention is to provide a clogging determining device for a reducing agent passage and a clogging determining method for a reducing agent passage in which clogging can be accurately detected, a clogged place can be estimated and a repair/exchange work can be efficiently performed in a case where clogging occurs in any place of a supply line or a return line.

Means of Solving the Problem

According to the present invention, a clogging determining device for a reducing agent passage in an exhaust gas purification system containing a pump for pressure-feeding reducing agent to reduce $NO_x$ in exhaust gas discharged from an internal combustion engine, a reducing agent injection valve for supplying the reducing agent pressure-fed from the pump to an exhaust gas passage, a first reducing agent passage disposed between the pump and the reducing agent injection valve, a pressure sensor for detecting the pressure in the first reducing agent passage, and a second reducing agent passage that is connected to the reducing agent injection valve and circulates the reducing agent is characterized by comprising: pump driving control means for subjecting the pump to DUTY control so that a value detected by the pressure sensor is kept to a predetermined value; driving DUTY determining means for determining whether the driving DUTY of the pump is less than a predetermined threshold value; pressure reduction amount calculating means for calculating a pressure reduction amount by which the pressure value detected by the pressure sensor is reduced within a predetermined time after the pump is stopped and also the reducing agent injection valve is fully opened when it is determined that the driving DUTY of the pump is less than the threshold value; and clogging determining means for determining on the basis of the pressure reduction amount calculated by the pressure reduction amount calculating means whether clogging occurs in the first reducing agent passage or the second reducing agent passage, whereby the above problem can be solved.

Furthermore, when the clogging determining device for the reducing agent passage according to the present invention is constructed, it is preferable that the pump driving detecting means determines whether the driving DUTY of the pump is not less than a predetermined threshold value when the reducing agent injection valve is set to be opened at a predetermined opening degree or more.

Still furthermore, when the clogging determining device for the reducing agent passage according to the present invention is constructed, it is preferable that the clogging determining means determines that clogging occurs in the first reducing agent passage when the pressure reduction amount calculated by the pressure reduction amount calculating means is less than a predetermined reference value.

Still furthermore, when the clogging determining device for the reducing agent passage according to the present invention is constructed, it is preferable that it is determined whether the driving DUTY of the pump is not less than a predetermined threshold value when the reducing agent injection valve is closed and also the reducing agent is allowed to be circulated through the second reducing agent passage.

Still furthermore, when the clogging determining device for the reducing agent passage according to the present invention is constructed, it is preferable that the clogging determining means determines that the second reducing agent passage is clogged when the pressure reduction amount calculated by the pressure reduction amount calculating means is not less than a predetermined reference value, and also it is determined that the first reducing agent passage is clogged when the pressure reduction amount is less than the reference value.

Furthermore, according to another aspect of the present invention, a clogging determining method for a reducing agent passage in an exhaust gas purification system containing a pump for pressure-feeding reducing agent to reduce $NO_x$ in exhaust gas discharged from an internal combustion engine, a reducing agent injection valve for supplying the reducing agent pressure-fed from the pump to an exhaust gas passage, a first reducing agent passage disposed between the pump and the reducing agent injection valve, a pressure sensor for detecting the pressure in the first reducing agent passage, and a second reducing agent passage that is connected to the reducing agent injection valve and circulates the reducing agent is characterized by comprising: a step of subjecting the pump to DUTY control so that a value detected by the pressure sensor is kept to a predetermined value and determining whether the driving DUTY of the pump is less than a predetermined threshold value; a step of stopping the pump and also fully opening the reducing agent injection valve when it is determined that the driving DUTY of the pump is less than the threshold value, and calculating a pressure reduction amount by which the pressure value in the first reducing agent passage detected by the pressure sensor is reduced within a predetermined time; and a step of determining on the basis of the calculated pressure reduction amount whether clogging occurs in the first reducing agent passage or the second reducing agent passage.

Furthermore, when the clogging determining method for the reducing agent passage of the invention is executed, it is preferable that clogging determination is performed when the temperature of $NO_x$ catalyst disposed in an exhaust passage is equal to or more than a predetermined reference value.

According to another aspect of the present invention, a clogging determining device for a reducing agent passage in an exhaust gas purification system containing a pump for pressure-feeding reducing agent to reduce $NO_x$ in exhaust gas discharged from an internal combustion engine, a reducing agent injection valve for supplying the reducing agent pressure-fed from the pump to an exhaust gas passage, a first reducing agent passage disposed between the pump and the reducing agent injection valve, and a pressure sensor for detecting the pressure in the first reducing agent passage is characterized by comprising: pump driving control means for subjecting the pump to DUTY control so that a value detected by the pressure sensor is kept to a predetermined value; driving DUTY determining means for determining whether the driving DUTY of the pump is less than a predetermined threshold value; pressure reduction amount calculating means for calculating a pressure reduction amount by which the pressure value detected by the pressure sensor is reduced within a predetermined time after the pump is stopped and also the reducing agent injection valve is fully opened when it is determined that the driving DUTY of the pump is less than the threshold value; and clogging determining means for determining on the basis of the pressure reduction amount calculated by the pressure reduction amount calculating means whether clogging occurs in the first reducing agent passage.

Still furthermore, according to another aspect of the present invention, a clogging determining method for a reducing agent passage in an exhaust gas purification system containing a pump for pressure-feeding reducing agent to reduce $NO_x$ in exhaust gas discharged from an internal combustion engine, a reducing agent injection valve for supplying the reducing agent pressure-fed from the pump to an exhaust gas passage, a first reducing agent passage disposed between the pump and the reducing agent injection valve and a pressure sensor for detecting the pressure in the first reducing agent passage is characterized by comprising: a step of subjecting the driving of the pump to DUTY control so that a value detected by the pressure sensor is kept to a predetermined value and determining whether the driving DUTY of the pump is less than a predetermined threshold value; a step of stopping the pump and also fully opening the reducing agent injection valve when it is determined that the driving DUTY of the pump is less than the predetermined threshold value, and calculating a pressure reduction amount by which the pressure value in the first reducing agent passage detected by the pressure sensor is reduced within a predetermined time; and a step of determining on the basis of the calculated pressure reduction amount whether clogging occurs in the first reducing agent passage.

Effect of the Invention

According to the clogging determining device for the reducing agent passage of the present invention, the device is shifted to a test mode to stop the pump when the pump is not indicative of predetermined driving DUTY, and the pressure variation in the first reducing agent passage extending from the pump when the reducing agent injection valve is fully opened and intercommunicating with the reducing agent injection valve is detected, whereby it can be estimated whether clogging occurs at any place in the first reducing agent passage or the second reducing agent passage. Accordingly, a work of specifying the clogged place can be omitted and the number of parts to be repaired/exchanged can be reduced, whereby the maintenance work can be efficiently performed.

Still furthermore, in the clogging determining device for the reducing agent passage according to this invention, the possibility of occurrence of clogging in the first reducing agent passage can be determined by detecting abnormality of the driving DUTY of the pump when the reducing agent injection valve is opened at a predetermined opening degree or more.

Still furthermore, in the clogging determining device for the reducing agent passage according to this invention, the clogging in the first reducing agent passage can be more accurately estimated by determining whether the pressure reduction amount in the first reducing agent passage is not less than a predetermined reference value under a predetermined state. Accordingly, the clogging-suspected first reducing agent passage can be selected and accurately repaired/exchanged.

Still furthermore, in the clogging determining device for the reducing agent passage, by detecting abnormal of the driving DUTY of the pump under the state that the reducing agent injection valve is closed and the reducing agent is allowed to be circulated, occurrence of clogging at any place in the first reducing agent passage and the second reducing agent passage can be determined.

Still furthermore, in the clogging determining device for the reducing agent passage, the clogging of the first reducing agent passage or the second reducing agent passage can be more accurately estimated by determining whether the pressure reduction amount in the first reducing agent passage is not less than a predetermined reference value under a predetermined state. Accordingly, the clogging-suspected first reducing agent passage or second reducing agent passage can be selected and accurately repaired/exchanged.

Furthermore, according to the clogging determining method for the reducing agent passage of the present invention, the processing is shifted to the test mode to stop the pump when the pump is not indicative of desired driving DUTY, and the pressure variation in the first reducing agent passage extending from the pump when the reducing agent injection valve is fully opened and intercommunicating with the reducing agent injection valve is detected, whereby it can be estimated whether clogging occurs at anyplace in the first reducing agent passage or the second reducing agent passage. Accordingly, a work of specifying the clogged place can be omitted and the number of parts to be repaired/exchanged can be reduced, whereby the maintenance work can be efficiently performed.

Still furthermore, in the clogging determining method for the reducing agent passage of the present invention, by performing the clogging determination under the state that the temperature of the $NO_x$ catalyst is within the predetermined temperature, the reducing agent is not used in the reductive reaction, and the amount of ammonium discharged to the atmosphere can be reduced.

Still furthermore, according to the other clogging determining device and clogging determining method for the reducing agent passage of the present invention, the processing is shifted to the test mode to stop the pump when the pump is not indicative of the predetermined driving DUTY, and the pressure variation in the first reducing agent passage extending from the pump and intercommunicating with the reducing agent injection valve when the reducing agent injection valve is fully opened is detected, whereby it can be estimated whether clogging occurs in the first reducing agent passage. Accordingly, a work of specifying the clogged place can be omitted and the number of parts to be repaired/exchanged can be reduced, whereby the maintenance work can be efficiently performed.

BEST MODES FOR CARRYING OUT THE INVENTION

Figure 1:
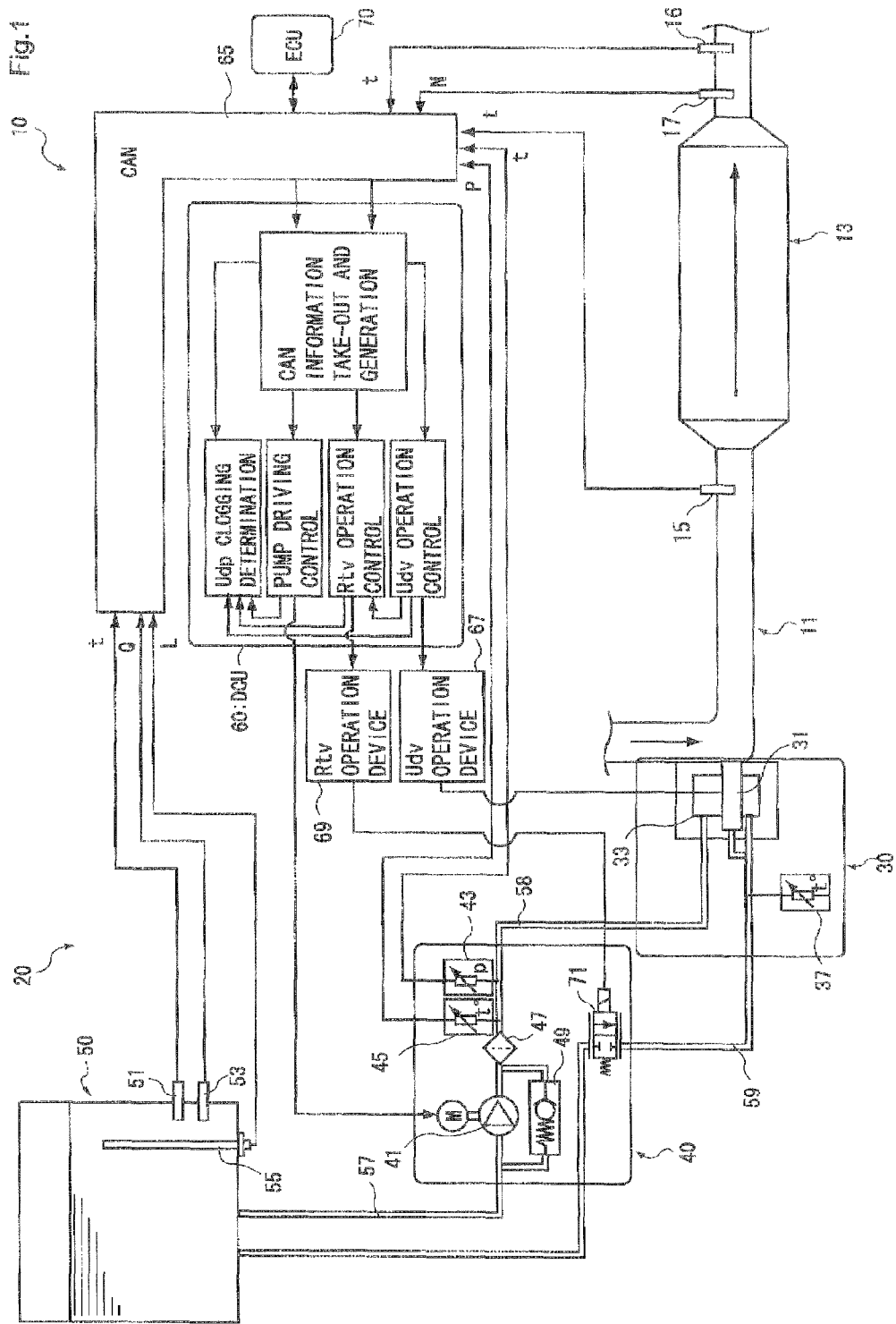
[FIG. 1] is a diagram showing an example of the construction of an exhaust gas purification system according to a first embodiment of the present invention.

Embodiments of a clogging determining device and a clogging determining method for a reducing agent passage according to the present invention will be described with referring to the drawings. The embodiments are examples of the present invention, and do not limit the present invention, so that any alteration may be made to these embodiments.

In the figures, the same reference numerals represent the same members, and the description thereof is arbitrarily omitted.

First Embodiment

1. Clogging Determining Device for Reducing Agent Passage (1) Whole Construction of Exhaust Gas Purification System First, an example of the construction of an exhaust gas purification system having a clogging determining device for a reducing agent passage according to an embodiment (hereinafter referred to as "system" in some cases) will be described with reference to FIG. 1.

The exhaust gas purification system 10 shown in FIG. 1 is an exhaust gas purification system 10 in which urea water solution is used as reducing agent and exhaust gas is passed through $NO_x$ catalyst 13 together with the reducing agent to thereby selectively reduce $NO_x$. This exhaust gas purification system 10 is provided with an $NO_x$ catalyst 13 for selectively reducing $NO_x$ contained in exhaust gas which is disposed at some midpoint of an exhaust gas passage 11 connected to an internal combustion engine and a reducing agent supply device 20 containing a reducing agent injection valve 31 for injecting reducing agent into the exhaust gas passage 11 at the upstream side of the $NO_x$ catalyst 13. Temperature sensors 15 and 16 are disposed at the upstream side and downstream side of the $NO_x$ catalyst 13 of the exhaust gas passage 11 respectively, and an $NO_x$ sensor 17 is disposed at the downstream side of the $NO_x$ catalyst 13. The $NO_x$ catalyst 13, the temperature sensors 15 and 16 and the $NO_x$ sensor 17 are not limited to specific constructions, and well-known constructions may be used.

The reducing agent supply device 20 has an injection module 30 containing the reducing agent injection valve 31, a storage tank 50 in which reducing agent is stocked, a pump module 40 containing a pump 41 for pressure-feeding the reducing agent in the storage tank 50 to the reducing agent injection valve 31, and a control unit (hereinafter referred to as "DCU: Dosing Control unit") 60 for controlling the injection module 30 and the pump module 40 to control the injection amount of the reducing agent to be injected from the reducing agent injection valve 31. The pump module 40 and the injection module 30 are connected to each other through a first supply passage (first reducing agent passage) 58, the storage tank 50 and the pump module 40 are connected to each other through a second supply passage 57, and the injection module 30 and the storage tank 50 are connected to each other through a circulating passage (second reducing agent passage) 59.

Furthermore, in the example of the exhaust gas purification system 10 shown in FIG. 1, DCU 60 is connected to CAN (Controller Area Network) 65. A control unit (hereinafter referred to as "ECU: Engine Control Unit" in some cases) 70 for controlling the operation state of the internal combustion engine is connected to CAN 65. Not only information concerning the operation state of the internal combustion engine such as the fuel injection amount, the injection timing, the rotational number, etc. are written into CAN 65, but also information of all the sensors, etc. provided to the exhaust gas purification system 10 is written into CAN 65. Furthermore, in CAN 65, it can be determined whether an input signal value is within a standard range of CAN 65 or not. DCU 60 connected to CAN 65 can read information on CAN 65 and output information onto CAN 65.

In this embodiment, ECU 70 and DCU 60 comprise separate control units, and information transmission/reception there between can be performed through CAN 65. However, ECU 70 and DCU 60 may be constructed as one control unit.

The storage tank 50 is provided with a temperature sensor 51 for detecting the temperature of reducing agent in the tank, a level sensor 55 for detecting the residual amount of the reducing agent and a quality sensor 53 for detecting the quality such as the viscosity, concentration, etc. of the reducing agent. The values detected by these sensors are output as signals and written onto CAN 60. Well-known sensors may be properly used as these sensors.

In the exhaust gas purification system of this invention, urea water solution is used as the reducing agent.

Furthermore, in a passage for supplying reducing agent to the reducing agent injection valve 31, the pump module 40 is provided with a pump 41, a pressure sensor 43 for detecting the pressure (hereinafter referred to as "pressure of reducing agent" in some cases) of the first supply passage 58 at the downstream side of the pump 41, a temperature sensor 45 for detecting the temperature of the reducing agent to be pressure-fed, a foreign material collecting filter 47 disposed at some midpoint of the first supply passage 58 at the downstream side of the pump 41, and a pressure control valve for returning a part of the reducing agent from the downstream side of the pump 41 to the upstream side of the pump 41 to reduce the pressure of the reducing agent when the pressure of the reducing agent at the downstream side of the pump 41 exceeds a predetermined value.

The pump 41 comprises an electrically-operated gear pump, and it is subjected to DUTY control according to a signal transmitted from DCU 60. The driving DUTY of the pump 41 is subjected to feedback control so that the pressure value in the first supply passage 58 which is detected by the pressure sensor 43 is kept to a predetermined value. That is, under the state that the pressure in the first supply passage 58 is reduced, the driving DUTY of the pump 41 is controlled to increase, and under the state that the pressure in the first supply passage 58 increases, the driving DUTY of the pump 41 is controlled to decrease.

The "driving DUTY of pump" means the rate of the driving time of the pump which occupies per period in the PWM (pulse width modulation) control.

Well-known members may be arbitrarily used for the pressure sensor 43 and the temperature sensor 45. These values detected by these sensors are also output as signals, and written onto CAN 60. Furthermore, the pressure control valve 49 is not limited, and a well-known check valve or the like may be used, for example.

Furthermore, a return valve 71 which can adjust the opening degree thereof in accordance with the flow rate of the reducing agent returned to the storage tank 50 is disposed at some midpoint of the circulating passage 59 for returning the reducing agent of the pump module 40 from the reducing agent injection valve 31 to the storage tank 50. When the injection amount of the reducing agent injection valve 31 is larger, the opening degree of the return valve 71 is set to a small value because the probability that the reducing agent before the injection is exposed to high temperature is low. Accordingly, the driving DUTY of the pump 41 is kept to be low, and the loss of the energy can be reduced. On the other hand, when the injection amount of the reducing agent injection valve 31 is small, the probability that the reducing agent before the injection is accumulated and thus exposed to high temperature is increased. Therefore, the opening degree of the return valve 71 is set to a large value.

An electromagnetic valve may be used as the usable return valve 71, for example.

The injection module 30 has a pressure chamber 33 in which reducing agent pressure-fed from the pump module 40 side is stocked, a reducing agent injection valve 31 connected to the pressure chamber 33 and a temperature sensor 37 disposed at the downstream side of the pressure chamber 33.

The reducing agent injection valve 31 comprises an ON-OFF valve which controls ON-OFF of the opening valve thereof through DUTY control. Reducing agent pressure-fed from the pump module 40 is accumulated under a predetermined pressure in the pressure chamber 33, and the reducing agent is injected into the exhaust gas passage 11 when the reducing agent injection valve 31 is opened on the basis of a control signal transmitted from DCU 60.

The temperature sensor 37 provided to the injection module 30 may be omitted.

The circulating passage 59 disposed between the injection module 30 and the storage tank 50 is used to make reducing agent reflow into the storage tank 50 so that reducing agent out of reducing agent injected from the reducing agent injection valve 31 of the injection module 30 among reducing agent pressure-fed from the pump module 40 is prevented from being affected by exhaust gas heat or the like and thus exposed to high temperature. In order to control the amount of reducing agent returned to the storage tank 50 through the circulating passage 59, the above-described return valve 71 is disposed at some midpoint of the circulating passage 59.

DCU 60 can control the operation of the reducing agent injection valve 31 on the basis of various information existing on CAN 65 so that a proper amount of reducing agent is injected into the exhaust gas passage 11. DCU 60 in this embodiment also functions as a clogging determining device for the reducing agent passage (hereinafter referred to as "clogging determining device" in some cases).

DCU 60 is mainly constructed by a well-known microcomputer. With respect to parts relating to the operation control of the reducing agent injection valve 31 and the driving control of the pump 41 and further the clogging determination of the reducing agent passage, construction examples represented by functional blocks are shown in FIG. 1.

That is, DCU 60 of this embodiment according to the present invention comprises a CAN information taking and generating unit (represented as "CAN information take-out and generation" in FIG. 1), a reducing agent passage clogging determining unit (represented as "Udp clogging determination" in FIG. 1), a pump driving controller (represented as "pump driving control" in FIG. 1), a reducing agent injection valve operation controller (represented as "Udv operation control" in FIG. 1), a return valve operation controller (represented as "Rtv operation control" in FIG. 1), RAM (Random Access Memory), etc. as main constituent elements.

These parts are specifically implemented by executing programs through a microcomputer (not shown).

The CAN information taking and generating unit reads information concerning the pressure of the reducing agent in the first supply passage 58 and information existing on CAN 65, and outputs these information to the respective parts.

The pump driving controller continually reads information concerning the pressure of reducing agent in the first supply passage 58 output from the CAN information generator, and executes feedback control on the pump 41 on the basis of this pressure information so that the pressure of the reducing agent in the first supply passage 58, the circulating passage 59 and the pressure chamber 33 is kept to a substantially fixed state. The pump 41 of the exhaust gas purification system of this embodiment is an electrically-operated pump, and thus when the output pressure value is lower than a target value, the electrically-operated pump 41 is controlled so that the driving DUTY thereof increases, thereby increasing the pressure. Conversely, when the output pressure value exceeds the target value, the electrically-operated pump 41 is controlled so that the driving DUTY thereof decreases, thereby reducing the pressure.

The reducing agent injection valve operation controller reads the information concerning the reducing agent in the storage tank 50, the information concerning the exhaust gas temperature, the $NO_x$ catalyst temperature and the $NO_x$ concentration at the downstream side of the $NO_x$ catalyst, the information concerning the operation state of the internal combustion engine, etc. which are output from the CAN information taking and generating unit, generates a control signal for injecting from the reducing agent injection valve 31 reducing agent whose amount is required to reduce $NO_x$ in exhaust gas, and outputs the control signal to a reducing agent injection valve operation device (represented as "Udv operation device" in FIG. 1) 67 for operating the reducing agent injection valve 31, a return valve driving controller and a reducing agent passage clogging determining unit. The reducing agent injection valve operation controller is configured to integrate the injection indication amount of the reducing agent indicated to the reducing agent injection valve operation device 67 (hereinafter referred to as "reducing agent injection indication amount" in some cases).

The reducing agent injection valve operation controller is switched to not only the normal injection mode of the reducing agent injection valve 31, but also the fully-close mode. In the fully-close mode, the integration of the reducing agent injection indication amount is carried out even when the reducing agent is set not to be actually injected.

The return valve driving controller generates a control signal of the return valve 71 in accordance with the temperature of the reducing agent in the first supply passage 58 and the circulating passage 59 and the injection indication value to be injected from the reducing agent injection valve 31, and outputs the control signal to the return valve operation device (represented as "Rtv operation device" in FIG. 1) 69 for operating the return valve 71 and the reducing agent passage clogging determining unit. For example, when the reducing agent injection indication value output from the reducing agent injection valve operation controller is small or when the temperature of the reducing agent measured by the temperature sensors provided to the pump module 40 and the injection module 30 indicates a high value, the return valve 71 is opened to have a predetermined opening degree and circulate the reducing agent so the reducing agent before injection is not set to high temperature and thus no hydrolysis occurs.

The purification of the exhaust gas by the exhaust gas purification system 10 constructed as shown FIG. 1 is performed as follows.

During operation of the internal combustion engine, the reducing agent in the storage tank 50 is pumped up by the pump 41, and pressure-fed to the injection module 30 side. At this time, the detection value obtained by the pressure sensor 43 at the downstream side of the pump 41 provided to the pump module 40 is fed back so that the output of the pump 41 is increased when the detection value is less than a predetermined value and the pressure of the pump 41 is reduced by the pressure control valve 49 when the pressure value exceeds the predetermined value. Accordingly, the pressure of the reducing agent which is pressure-fed to the injection module 30 side is controlled to be kept to a substantially fixed value.

Furthermore, the reducing agent which is pressure-fed from the pump module 40 to the injection module 30 flows into the pressure chamber 33 of the reducing agent and is kept to a substantially fixed pressure, whereby the reducing agent is injected into the exhaust gas passage 11 at all times when the reducing agent injection valve 31 is opened. The reducing agent reflows through the circulating passage 59 into the storage tank 50 while the flow rate thereof is controlled by the return valve 71. Therefore, the reducing agent which is not injected into the exhaust gas passage 11 is stocked in the pressure chamber 33, and thus it is not exposed to high temperature by exhaust gas heat.

Under the state that the reducing agent is stocked under a substantially fixed pressure value in the pressure chamber 33, DCU 60 determines the amount of reducing agent to be injected on the basis of the information such as the operation state of the internal combustion engine, the exhaust gas temperature, the temperature of the $NO_x$ catalyst 13, the amount of $NO_x$ which is passed through the $NO_x$ catalyst 13 without being reduced and measured at the downstream side of the $NO_x$ catalyst 13, etc., generates the control signal corresponding to the determined reducing agent amount and outputs it to the reducing agent injection valve operation device 67. The DUTY control of the reducing agent injection valve 31 is performed by the reducing agent injection valve operation device 67, and a proper amount of reducing agent is injected into the exhaust gas passage 11. The reducing agent injected into the exhaust passage 11 flows into the $NO_x$ catalyst 13 under the state that it is mixed into the exhaust gas, and used for the reductive reaction of $NO_x$ contained in the exhaust gas. The purification of the exhaust gas is performed as described above.

(2) Clogging Determining device

Figure 2:
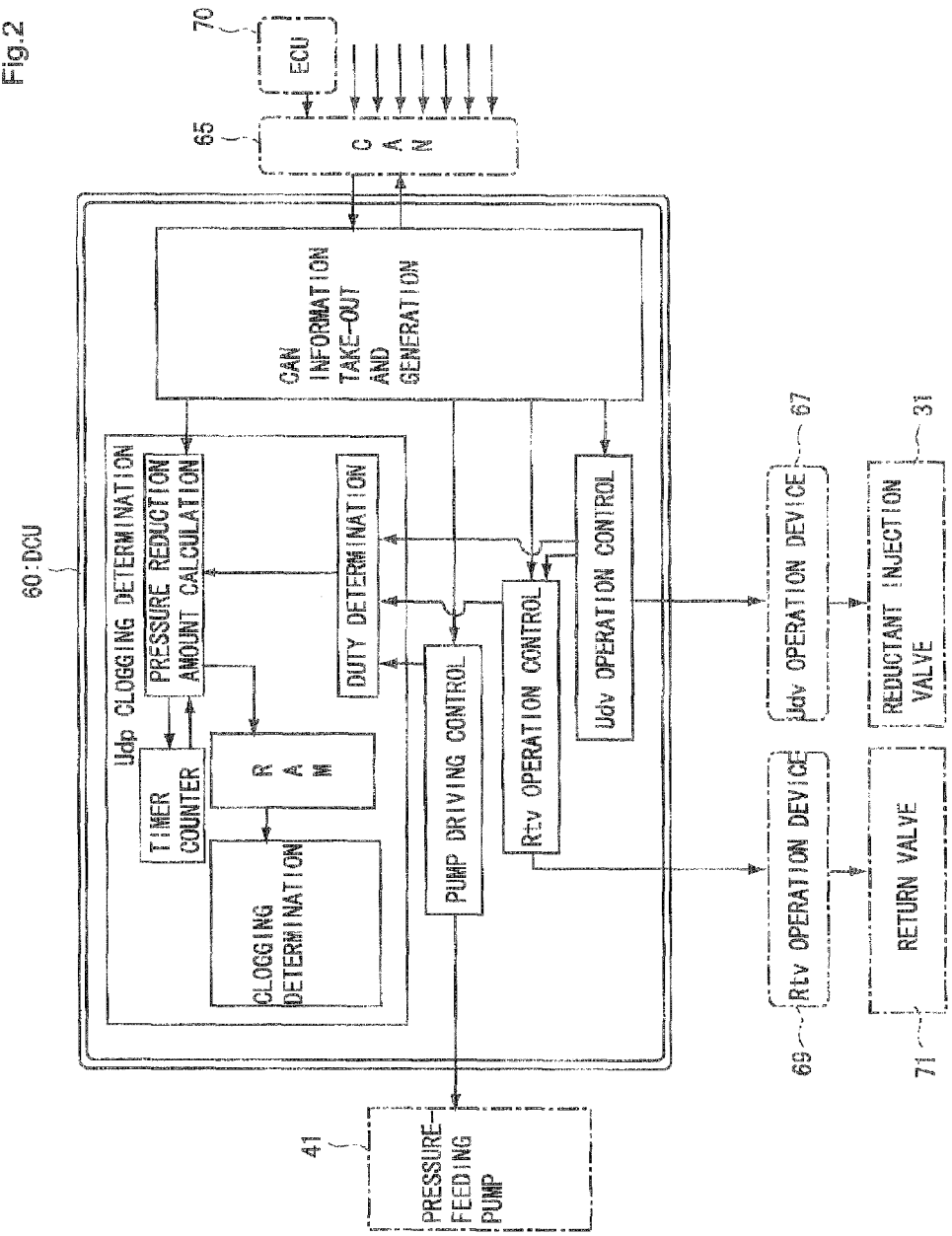
[FIG. 2] is a block diagram showing an example of the construction of a clogging determining device for a reducing agent passage according to the first embodiment.

Here, DCU 60 of the embodiment according to the present invention is provided with a reducing agent passage clogging determining unit (hereinafter referred to as "clogging determining unit"). When the driving DUTY of the pump 41 is lower than a predetermined threshold value (referred to as "determination reference value D" in some cases), the clogging determining unit stops the driving of the pump 41, and performs a predetermined calculation described later on the basis of the reducing agent pressure information output from the CAN information generator under the state that the reducing agent injection valve 31 is fully opened, thereby determining whether clogging occurs at any place in the first supply passage (first reducing agent passage) 58 and the circulating passage (second reducing agent passage) 59. As shown in FIG. 2 the reducing agent passage clogging determining unit contains driving DUTY determining means (represented as "DUTY determination" in FIG. 2), pressure reduction amount calculating means (represented as "pressure reduction amount calculation" in FIG. 2), clogging determining means (represented as "clogging determination" in FIG. 2) and a timer counter unit (represented as "timer counter" in FIG. 2).

The driving DUTY determining means compares the driving DUTY of the pump with a predetermined threshold value to determine whether the pump is properly driven. The exhaust gas purification system of this embodiment has the reducing agent injection valve and the return valve for adjusting the return amount of reducing agent as elements affecting the driving DUTY of the pump. Therefore, when the opening degree of the reducing agent injection valve is equal to a stipulated value or more or when the opening degree of the return valve is equal to a stipulated value or more, the driving DUTY determining means of this embodiment determines whether the driving DUTY of the pump is equal to a threshold value or more.

That is, when the driving DUTY of the pump 41 for pressure-feeding reducing agent is not so high under the state that it is assumed that a high flow rate of fuel flows through the reducing agent injection valve or the return valve, that is, when the pressure value detected by the pressure sensor is kept to the injection-controllable lowest pressure or more, inconsistency occurs in the control state, so that it is determined that clogging occurs in the reducing agent passage.

The pressure reduction amount calculating means stops the pump, fully opens the reducing agent injection valve and fully closes the return valve under the state that the reducing agent injection valve is set to an injection mode after abnormality of the driving DUTY is detected, and then calculates the difference (pressure reduction amount: hereinafter referred to as "UPD" in some cases) between the start value of the pressure (hereinafter referred to as "Ibint" in some cases) when a predetermined condition described later is satisfied and a pressure value P detected after a predetermined time elapses.

Furthermore, the clogging determining means provided to the clogging determining unit in DCU of this embodiment determines whether the value of UPD is not more than a predetermined clogging determination reference value D, thereby determining whether clogging occurs at any place in the first supply passage and the circulating passage.

Furthermore, RAM is connected to the clogging determining unit, and the pressure information of the reducing agent output from the CAN information generator is written and stored in RAM for a predetermined period. Specifically, the pressure value when the driving of the pump is stopped is stored as an initial value (hereinafter referred to as "Init" in some cases), and then the pressure value detected when the difference between the value of Init and the detected pressure value P is equal to a predetermined value N or more is stored as the start value (Ibint). Furthermore, the pressure reduction amount the value of UPD calculated by the pressure reduction amount calculating means is also stored.

Furthermore, the timer counter unit is used to count the time when the pressure reduction amount of the reducing agent is calculated, and in the example of DCU of this embodiment, a timer 1 and a timer 2 can be actuated.

2. Clogging Determining Method

Figure 3:
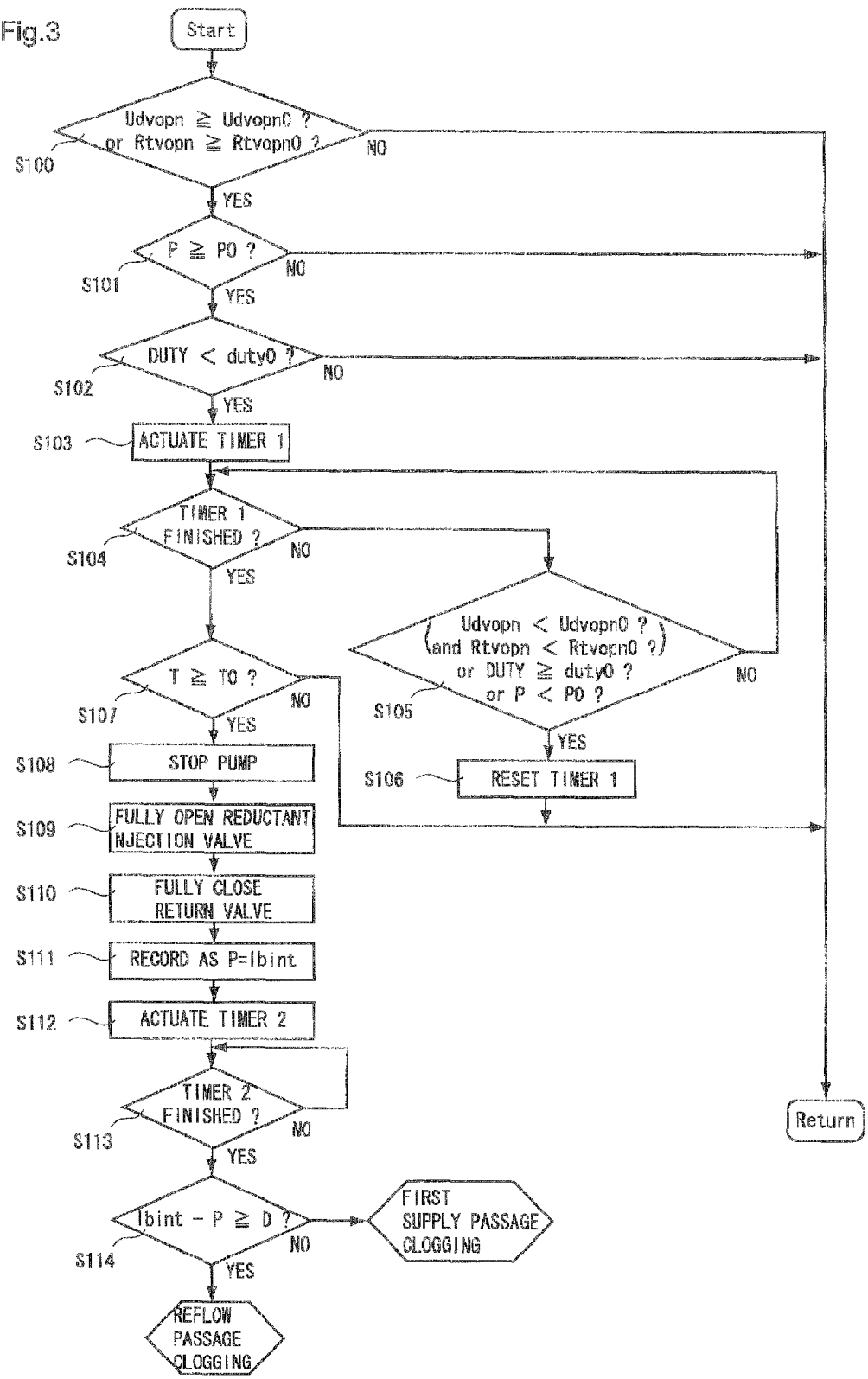
[FIG. 3] is a flowchart showing an example of the clogging determining method for the reducing agent passage according to the first embodiment.

Next, an example of the routine of the clogging determining method for the reducing agent passage by the clogging determining device for the reducing agent passage according to this embodiment will be described with reference to a control flow shown in FIG. 3. This routine may be executed at all times or may be executed by interruption every fixed time.

In step S100 after start, it is first determined whether the opening degree Udvopn of the reducing agent injection valve is equal to a stipulated value Udvopn0 or more, or whether the opening degree Rtvopn of the return valve is equal to a stipulated value Rtvopn0 or more. When each of both the conditions is not satisfied, the processing is returned to the start position. On the other hand, when any one of the conditions is satisfied, the processing goes to step S101.

It is determined in step S101 whether the pressure value P of the reducing agent is not less than the stipulated value P0. In case of P<P0, the processing is returned to the start position. On the other hand, in case of P≦P0, the processing goes to step S102.

Subsequently, in step S102, it is determined whether the driving DUTY of the pump is less than a predetermined threshold value duty0. When the driving DUTY is less than the threshold value duty0, inconsistency occurs in the control state, and clogging may occur in the reducing agent passage. Therefore, the processing is shifted to a test mode subsequently to the step S103. On the other hand, when the driving DUTY is equal to the threshold value duty0 or more, the device is determined to be under a normal control state, and thus the processing is returned to the start position.

In step S103 after the shift to the test mode, the timer 1 is actuated. Subsequently, it is determined in step S104 whether the timer 1 is finished or not. When the timer 1 is under operation, the processing goes to step S105, and it is determined whether the opening degree Udvopn of the reducing agent injection valve and the opening degree of the return valve Rtvopn are smaller than the stipulated values Udvopn0 and Rtvopn0, or whether the driving DUTY of the pump is not less than the threshold value duty0 or the pressure value P of the reducing agent is less than the stipulated value P0. When any of the conditions is satisfied, the timer 1 is reset in step S106, and then the processing is returned to the start position. On the other hand, when each condition is not satisfied, the processing is returned to step S104 to repeat the determination until the timer 1 is finished.

When the timer 1 is finished, it is determined in step S107 whether the temperature T of the $NO_x$ catalyst is not less than a stipulated value T0. When the catalyst temperature T is less than the stipulated value T0, if the injection amount of the reducing agent is directly increased, there is a risk that the reducing agent is not used for the reduction of $NO_x$, and directly slips through the catalyst. Therefore, the test mode is interrupted and the processing is returned to the start position. On the other hand, when the catalyst temperature T is not less than the stipulated value T0, after the pump is stopped in step S108, the reducing agent injection valve is fully opened in step S109, and then the return valve is fully closed in step S110.

Subsequently, in step S111, the pressure P of the reducing agent at this time is recorded as the value of Ibint, and also the timer 2 is actuated in step S112. Subsequently, in step S113, the determination is repeated until the timer 2 is finished, and the processing goes to step S114 when the timer 2 is finished.

In step S114, it is determined whether the difference between the pressure value P of the reducing agent and the value of Ibint is not less than the clogging determination reference value D at the time point when the timer 2 is finished. When the difference between the pressure value P of the reducing agent and the value of Ibint is not less than the clogging determination reference value D, the pressure of the reducing agent is lowered as a result of the injection of the reducing agent in the first supply passage from the reducing agent injection vale, and thus no clogging occurs in the first supply passage from the pump to the reducing agent injection valve, so that it is estimated that the circulating passage is clogged. On the other hand, when the difference between the pressure value P of the reducing agent and the value of Ibint is less than the clogging determination reference value D, the reducing agent is not injected although the reducing agent injection valve is fully opened, so that it is estimated that the first supply passage is clogged.

Second Embodiment

1. Clogging Determining Device for Reducing Agent Passage

Figure 4:
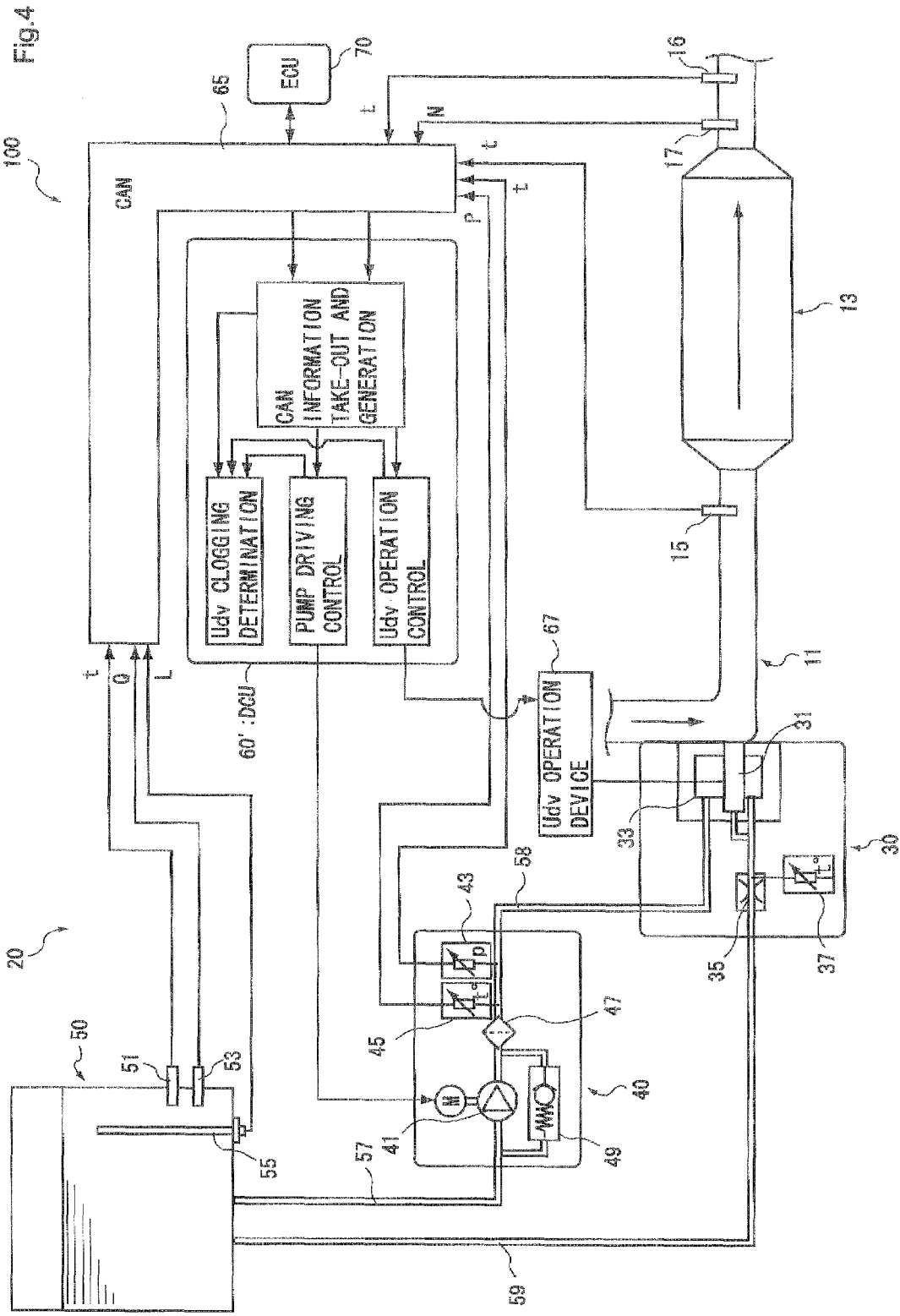
[FIG. 4] is a diagram showing an example of the construction of an exhaust gas purification system according to a second embodiment of the present invention.

An example of the construction of an exhaust gas purification system having a clogging determining device for a reducing agent passage according to this embodiment (hereinafter referred to as "system" in some cases) is shown in FIG. 4.

The exhaust gas purification system 100 shown in FIG. 4 is constructed so that an orifice 35 is provided in place of the return valve 71 provided to the circulating passage 59 in the exhaust gas purification system 10 of the first embodiment shown in FIG. 1.

That is, the injection module 30 in the exhaust gas purification system 100 of this embodiment has a pressure chamber 33 in which reducing agent pressure-fed from the pump module 40 side is stocked, a reducing agent injection valve 31 connected to the pressure chamber 33, an orifice 35 disposed at some midpoint of a passage extending from the pressure chamber 33 and intercommunicating with a circulating passage 59, and a temperature sensor 37 disposed just before the orifice 35. The orifice 35 is disposed in the passage at the downstream side of the pressure chamber 33. Therefore, when the injection amount from the reducing agent injection valve 31 is small, that is, when the driving DUTY of the pump 41 is low, no squeeze effect of the orifice 35 appears and thus reducing agent can be returned to the storage tank 50 although the reducing agent is stocked and easily exposed to high temperature. Therefore, the reducing agent can be prevented from being remarkably increased to high temperature. Furthermore, when the injection amount from the reducing agent injection valve 31 is large, the internal pressure of the pressure chamber 33 and the first supply passage 58 at the upstream side of the orifice 35 of the circulating passage 59 is lowered, so that the output of the pump module 40 can be suppressed to a small value.

Furthermore, since the orifice 35 is provided in place of the return valve, the driving controller for the return valve of DCU 60 is omitted.

As in the case of the first embodiment, the temperature sensor 37 provided to the injection module 30 may be omitted.

2. Clogging Determining Method

Figure 5:
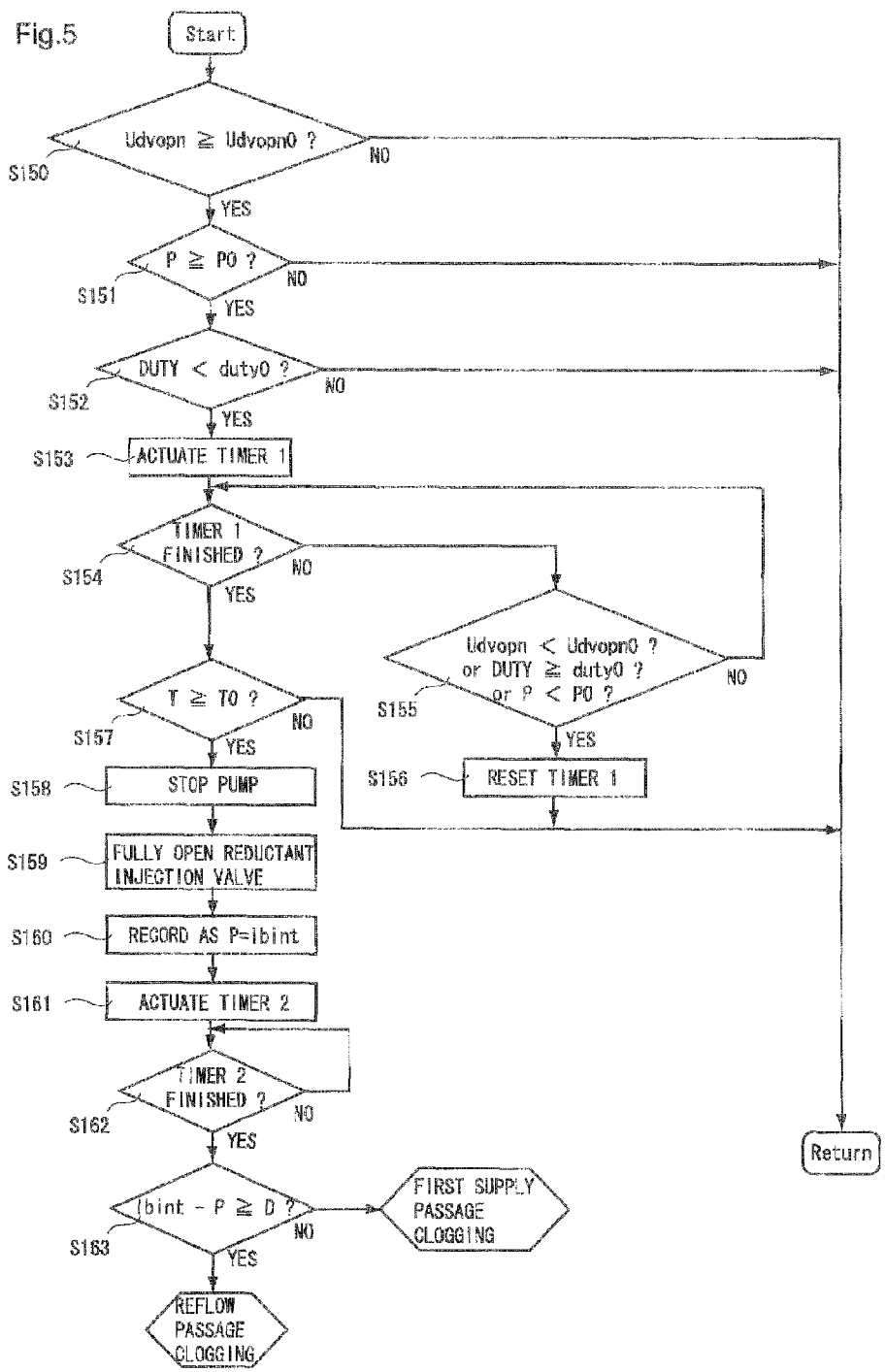
[FIG. 5] is a flowchart showing an example of the clogging determining method for the reducing agent passage according to the second embodiment.

Next, an example of the routine of the clogging determining method for the reducing agent passage by the clogging determining device for the reducing agent passage according to this embodiment will be described with reference to the control flow shown in FIG. 5. This routine may be executed at all times, or may be executed by interruption every fixed time.

First, in step S150 after the start, it is determined whether the opening degree Udvopn of the reducing agent injection valve is not less than the stipulated value Udvopn0. When the value of Udvopn is less than the stipulated value Udvopn0, the processing is returned to the start position. On the other hand, when the value of Udvopn is not less than the stipulated value Udvopn0, the processing goes to step S151.

In step S151, it is determined whether the pressure value P of the reducing agent is not less than the stipulated value P0. In case of the value of P<P0, the processing is returned to the start position. On the other hand, in case of the value of P≧P0, the processing goes to step S152.

Subsequently, in step S152, it is determined whether the driving DUTY of the pump is less than a predetermined threshold value duty0. When the driving DUTY is less than the threshold value duty0, inconsistency occurs in the control state, and the reducing agent passage may be clogged. Therefore, the processing is shifted to the test mode subsequent to the step S153. On the other hand, when the driving DUTY is not less than the threshold value duty0, it is determined that the device is under a normal control state, and thus the processing is returned to the start position.

In the step S153 after the processing is shifted to the test mode, the timer 1 is first actuated. Subsequently, it is determined in step S154 whether the timer 1 is finished or not. When the timer 1 is under operation, the processing goes to step S155 to determine whether the opening degree Udvopn of the reducing agent injection valve is smaller than the stipulated value Udvopn0, or the driving DUTY of the pump is not less than the threshold value duty0 or the pressure value P of the reducing agent is less than the stipulated value P0. When any condition is satisfied, in step S156 the timer 1 is reset and then the processing is returned to the start position. On the other hand, when each condition is not satisfied, the processing is returned to step S154 to repeat the determination step until the timer 1 is finished.

When the timer 1 is finished, it is determined in step S157 whether the temperature T of the $NO_x$ catalyst is not less than the stipulated value T0. When the catalyst temperature T is less than the stipulated value T0, the reducing agent is not used to reduce $NO_x$ and thus it may directly slip through the catalyst if the injection amount of the reducing agent is increased. Accordingly, the test mode is interrupted and the processing is returned to the start position. On the other hand, when the catalyst temperature T is not less than the stipulated value T0, the pump is stopped in step S158, and then the reducing agent injection valve is fully opened in step S159.

Subsequently, in step S160 the pressure value P of the reducing agent at this time is recorded as the value of lbint, and also the timer 2 is actuated in step S161. Subsequently, in step S162, the determination step is repeated until the timer 2 is finished. When the timer 2 is finished, the processing goes to step S163.

In step S163, it is determined whether the difference between the pressure value P of the reducing agent and the value of lbint at the time point when the timer 2 is finished is equal to or more than the clogging determining reference value D. When the difference between the pressure value P of the reducing agent and the value of lbint is not less than the clogging determining reference value D, as a result of the injection of the reducing agent in the first supply passage from the reducing agent injection valve, the pressure of the reducing agent is lowered and no clogging occurs in the first supply passage from the pump till the reducing agent injection valve, so that it is estimated that the circulating passage is clogged. On the other hand, when the difference between the pressure value P of the reducing agent and the value of lbint is less than the clogging determining reference value D, the reducing agent is not injected although the reducing agent injection valve is fully opened, so that it is estimated that the first supply passage is clogged.

Third Embodiment

1. Whole Construction of Exhaust Gas Purification System

An exhaust gas purification system having a clogging determining device for a reducing agent passage according to this embodiment is different from the exhaust gas purification system of the first embodiment in the construction of the reducing agent passage of the reducing agent supply device.

Figure 6:
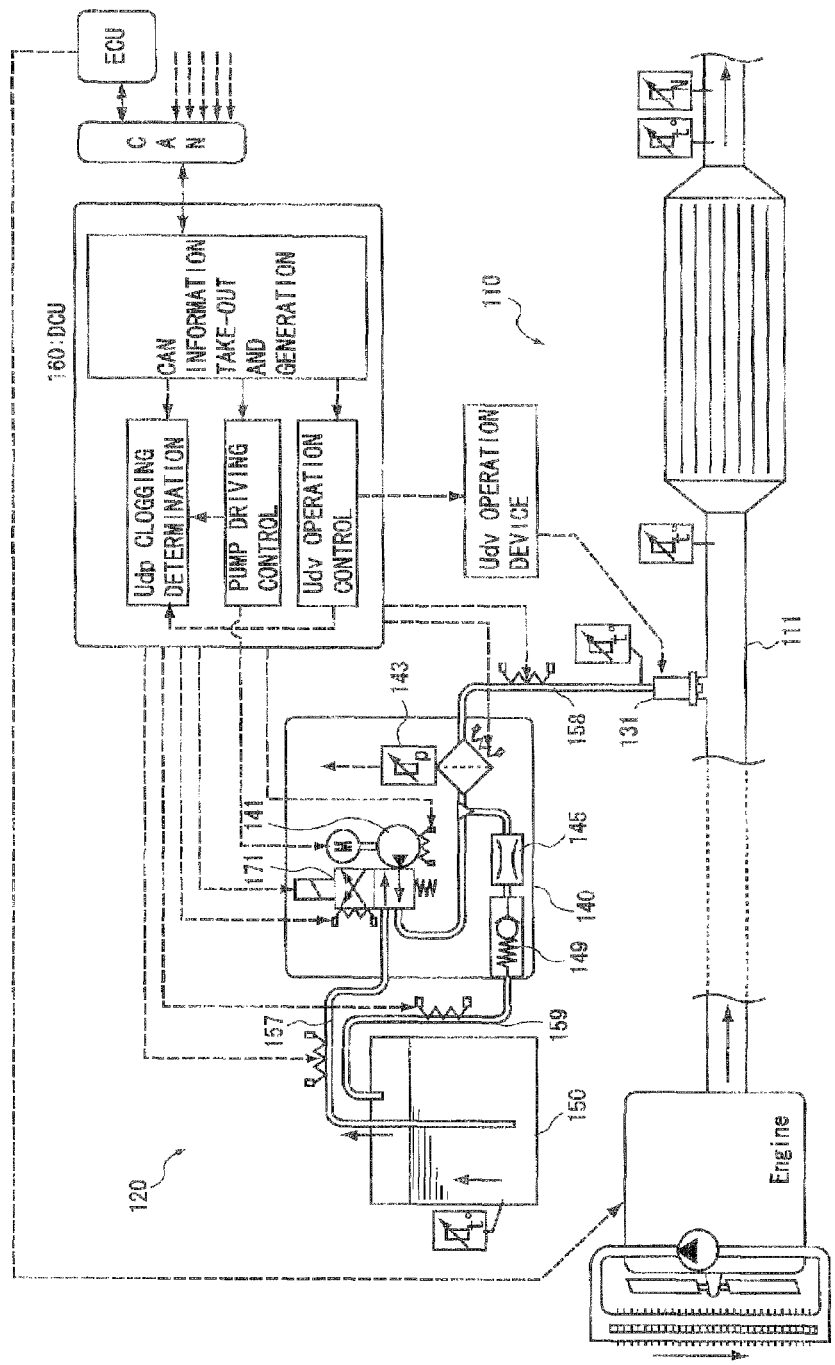
[FIG. 6] is a diagram showing an example of the construction of an exhaust gas purification system according to a third embodiment of the present invention.

FIG. 6 shows an example of the construction of the exhaust gas purification system 110 according to this embodiment, and the same constituent elements of the exhaust gas purification system of the first embodiment are used as the constituent elements other than the reducing agent supply device 120.

The reducing agent supply device 120 provided to the exhaust gas purification system 110 of this embodiment has a reducing agent injection valve 131, a storage tank 150 in which reducing agent is stocked, a pump module 140 containing a pump 141 for pressure-feeding reducing agent in the storage tank 150 to the reducing agent injection valve 131, and DCU 160 for performing injection amount control of the reducing agent injection valve 131. The pump module 140 and the reducing agent injection valve 131 are connected to each other through a first supply passage (first reducing agent passage) 158, the storage tank 150 and the pump module 140 are connected to each other through a second supply passage 157, and the pump module 140 and the storage tank 150 are connected to each other through a circulating passage (second reducing agent passage) 159.

The reducing agent supply device 120 is different from the reducing agent supply device of the exhaust gas purification system of the first embodiment in that the circulating passage 159 branched at some midpoint of the first supply passage 158 is connected to the storage tank 150. An orifice 145 is provided at some midpoint of the circulating passage 159, and also a pressure control valve 149 is provided to be nearer to the storage tank 150 side than the orifice 145. By providing the circulating passage 159 as described above, the pressure control valve 149 is opened and a part of the reducing agent reflows into the storage tank 150 when the pressure value of the first supply passage 158 exceeds a predetermined value under the state that the reducing agent is pressure-fed by the pump 141 which is subjected to the feedback control on the basis of the sensor value of the pressure sensor 143. For example, a well-known check valve or the like may be used as the pressure control valve 149.

The pump module 140 of the exhaust gas purification system 110 of this embodiment is provided with a reverting valve 171. When the injection control of the reducing agent is performed while the internal combustion engine 105 is under operation state, the flow path of the reducing agent is set to a positive direction which directs from the pump 141 to the reducing agent injection valve 131. On the other hand, when the internal combustion engine 105 is stopped, the flow path of the reducing agent is switched to the opposite direction which directs from the reducing agent injection valve 131 to the pump 141 in order to withdraw the reducing agent remaining in the reducing agent passage into the storage tank 150.

Furthermore, a part of DCU 160 provided to the exhaust gas purification system 110 of this embodiment, which performs the injection control of the reducing agent to the exhaust gas passage 111, is mainly constructed by a CAN information taking and generating unit (represented as "CAN information take-out and generation" in FIG. 6), a reducing agent passage clogging determining unit (represented as "Udp clogging determination" in FIG. 6), a pump driving controller (represented as "pump driving control" in FIG. 6), a reducing agent injection valve operation controller (represented as "Udv operation control" in FIG. 6), RAM (Random Access Memory), etc. This construction of DCU 160 is different from DCU provided to the exhaust gas purification system of the first embodiment in that the return valve driving controller is not provided.

That is, as described above, in the exhaust gas purification system of this embodiment, the orifice 145 and the pressure control valve 149 are provided in the circulating passage 159 which is branched at some midpoint of the first supply passage 158. When the pump 141 is driven and the pressure in the first supply passage 158 is higher than a set pressure, the reducing agent in the first supply passage 158 is returned through the pressure control valve 149 into the storage tank 150. Therefore, DCU 160 is not provided with the return valve driving controller.

DCU 160 performs the power supply control to the reducing agent injection valve 131 to inject a proper amount of reducing agent into the exhaust gas passage 111 under the state that the pressure in the first supply passage 158 is kept to a predetermined value by the driving of the pump 141 and the reflow of the reducing agent which is executed through the pressure control valve 149.

2. Construction of Clogging Determining Device (DCU)

Figure 7:
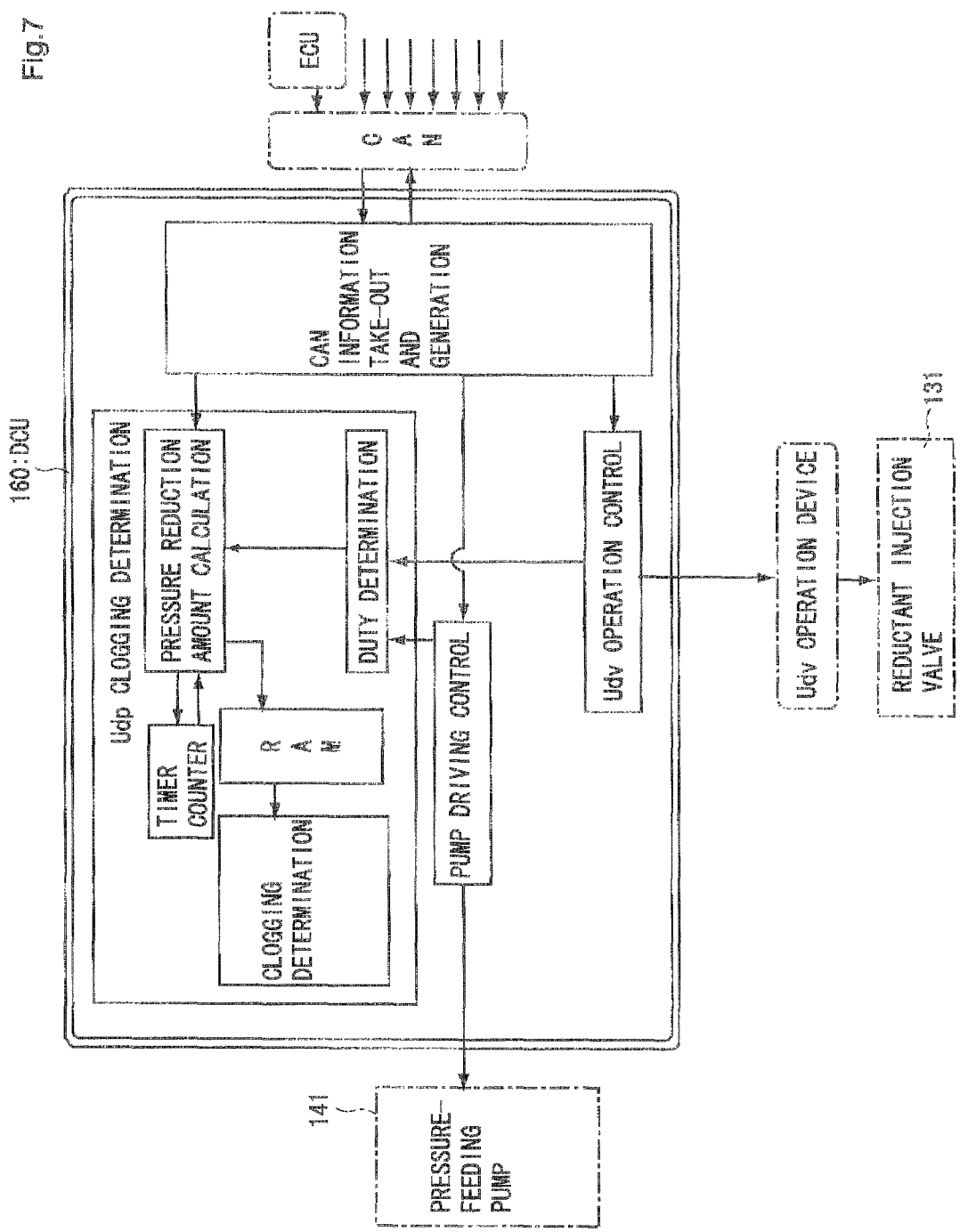
[FIG. 7] is a block diagram showing an example of the construction of a clogging determining device for a reducing agent passage according to the third embodiment.
Figure 8:
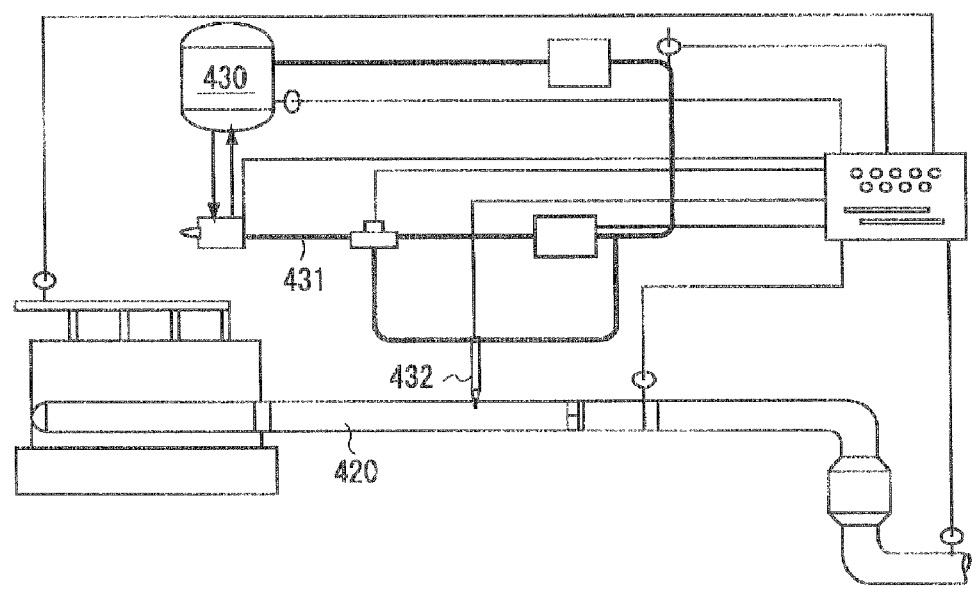
[FIG. 8] is a diagram showing the construction of a conventional exhaust gas purification system.

FIG. 7 shows the detailed construction of the clogging determining unit of the reducing agent passage (hereinafter referred to as "clogging determining unit") out of the construction of DCU 160 provided to the exhaust gas purification system of this embodiment.

When the driving DUTY of the pump 141 is lower than a predetermined threshold value (referred to as "determination reference value D" in some cases), the clogging determining unit stops the driving of the pump 141, and also executes a predetermined calculation described later on the basis of the pressure information of the reducing agent output from the CAN information generator under the state that the reducing agent injection valve 131 is fully opened, thereby determining whether the first supply passage 158 is clogged or not.

As shown in FIG. 7, the reducing agent passage clogging determining unit contains driving DUTY determining means (represented as "DUTY determination" in FIG. 7), pressure reduction amount calculating means (represented as "pressure reduction amount calculation" in FIG. 7), clogging determining means (represented as "clogging determination" in FIG. 7), and a timer counter unit (represented as "timer counter" in FIG. 7).

These parts basically have the same functions as the parts constituting the reducing agent passage clogging determining unit out of DCU provided to the exhaust gas purification system of the first embodiment. In the case of the construction of the exhaust gas purification system 110 of the embodiment shown in FIG. 6, the reducing agent passage intercommunicating with the reducing agent injection valve 131 comprises only the first supply passage 158, and thus the target of the clogging determination is limited to only the first supply passage 158.

As in the case of the first embodiment, the difference (UPD) between the start value (lbint) of the pressure and the pressure value (P) is calculated in the pressure reduction amount calculating means, and it is determined in the clogging determining means whether the value of UPD is equal to a predetermined clogging determination reference value D or less, thereby determining whether the first supply passage is clogged. That is, the presence or absence of clogging of the first supply passage is determined on the basis of the transition of the pressure reduction when the reducing agent injection valve is fully opened from the state that the pressure value in the first supply passage is kept to a predetermined value.

In the exhaust gas purification system of this embodiment, a specific method of the clogging determination of the reducing agent passage which is executed by the clogging determining device (DCU) 160 is the same as the clogging determining method described with reference to the second embodiment, and thus the description thereof is omitted.

INDUSTRIAL APPLICABILITY

According to the clogging determining method for the reducing agent passage based on the flowchart described above, when clogging occurs at any place of the reducing agent passage in the exhaust gas purification system using urea, not only occurrence of clogging can be detected, but also a clogged place can be estimated. Therefore, the work of specifying the clogged place can be omitted, and the number of parts to be repaired/exchanged can be reduced, so that the efficiency of the maintenance work can be promoted.

The constructions of the exhaust gas purification systems shown in FIGS. 1, 4 and 6 are examples, and thus the exhaust gas purification system which can implement the clogging determining method of the reducing agent injection valve according to the present invention is not limited to the exhaust gas purification systems constructed as described above. For example, CAN may be omitted, or DCU may be constructed to be integrated with engine ECU. As another example may be used an exhaust as purification system from which the circulating passage provided for the purpose of the temperature control of reducing agent is omitted.

Furthermore, in the above embodiments, the output of each sensor is output as a digital signal for CAN communication, however, the present invention is not limited to this style. Information from each sensor may be directly output to each control device by using conventional analog signal.

The invention claimed is:

1. A clogging determining device for a reducing agent passage in an exhaust gas purification system having a pump for pressure-feeding reducing agent to reduce $NO_x$ in exhaust gas discharged from an internal combustion engine, a reducing agent injection valve for supplying the reducing agent pressure-fed from the pump to an exhaust gas passage, a first reducing agent passage disposed between the pump and the reducing agent injection valve, and a pressure sensor for detecting the pressure in the first reducing agent passage, the clogging determining device comprising:
   pump driving control means for subjecting the pump to DUTY control so that a value detected by the pressure sensor is kept to a predetermined value;
   driving DUTY determining means for determining whether a driving DUTY of the pump is less than a predetermined threshold value;
   pressure reduction amount calculating means for calculating a pressure reduction amount by which the pressure value detected by the pressure sensor is reduced within a predetermined time after the pump is stopped and also the reducing agent injection valve is fully opened when it is determined that the driving DUTY of the pump is less than the threshold value; and
   clogging determining means for determining on a basis of the pressure reduction amount calculated by the pressure reduction amount calculating means whether clogging occurs in the first reducing agent passage.

2. A clogging determining device for a reducing agent passage in an exhaust gas purification system having a pump for pressure-feeding reducing agent to reduce $NO_x$ in exhaust gas discharged from an internal combustion engine, a reducing agent injection valve for supplying the reducing agent pressure-fed from the pump to an exhaust gas passage, a first reducing agent passage disposed between the pump and the reducing agent injection valve, a pressure sensor for detecting the pressure in the first reducing agent passage, and a second reducing agent passage that is connected to the reducing agent injection valve and circulates the reducing agent, the clogging determining device comprising:
   a pump driving control means for subjecting the pump to DUTY control so that a value detected by the pressure sensor is kept to a predetermined value;
   driving DUTY determining means for determining whether a driving DUTY of the pump is less than a predetermined threshold value;
   pressure reduction amount calculating means for calculating a pressure reduction amount by which a pressure value detected by the pressure sensor is reduced within a predetermined time after the pump is stopped and also the reducing agent injection valve is fully opened when it is determined that the driving DUTY of the pump is less than the threshold value; and
   clogging determining means for determining on a basis of the pressure reduction amount calculated by the pressure reduction amount calculating means whether clogging occurs in the first reducing agent passage or the second reducing agent passage.

3. The clogging determining device for the reducing agent passage according to claim 2,
   wherein the pump driving DUTY means determines whether the driving DUTY of the pump is less than a predetermined threshold value when the reducing agent injection valve is set to be opened at a predetermined opening degree or more.

4. The clogging determining device for the reducing agent passage according to claim 3,
   wherein the clogging determining means determines that clogging occurs in the first reducing agent passage when the pressure reduction amount calculated by the pressure reduction amount calculating means is less than a predetermined reference value.

5. The clogging determining device for the reducing agent passage according to claim 2,
   wherein the pump driving DUTY means determines whether the driving DUTY of the pump is less than a predetermined threshold value when the reducing agent injection valve is closed and the reducing agent is allowed to be circulated through the second reducing agent passage.

6. The clogging determining device for the reducing agent passage according to claim 5,
   wherein the clogging determining means determines that the second reducing agent passage is clogged when the pressure reduction amount calculated by the pressure reduction amount calculating means is not less than a predetermined reference value, and also it is determined that the first reducing agent passage is clogged when the pressure reduction amount is less than the reference value.

7. A clogging determining method for a reducing agent passage in an exhaust gas purification system having a pump for pressure-feeding reducing agent to reduce $NO_x$ in exhaust gas discharged from an internal combustion engine, a reducing agent injection valve for supplying the reducing agent pressure-fed from the pump to an exhaust gas passage, a first reducing agent passage disposed between the pump and the reducing agent injection valve and a pressure sensor for detecting the pressure in the first reducing agent passage, the clogging determining method comprising:
   a step of subjecting the pump to DUTY control so that a value detected by the pressure sensor is kept to predetermined value and determining whether a driving DUTY of the pump is less than a predetermined threshold value;

a step of stopping the pump and also fully opening the reducing agent injection valve when it is determined that the driving DUTY of the pump is less than the predetermined threshold value, and calculating a pressure reduction amount by which a pressure value in the first reducing agent passage detected by the pressure sensor is reduced within a predetermined time; and a step of determining on a basis of a calculated pressure reduction amount whether clogging occurs in the first reducing agent passage.

8. A clogging determining method for a reducing agent passage in an exhaust gas purification system having a pump for pressure-feeding reducing agent to reduce $NO_x$ in exhaust gas discharged from an internal combustion engine, a reducing agent injection valve for supplying the reducing agent pressure-fed from the pump to an exhaust gas passage, a first reducing agent passage disposed between the pump and the reducing agent injection valve, a pressure sensor for detecting the pressure in the first reducing agent passage, and a second reducing agent passage that is connected to the reducing agent injection valve and circulates the reducing agent, the clogging determining method comprising:

a step of subjecting the pump to DUTY control so that a value detected by the pressure sensor is kept to a predetermined value and determining whether a driving DUTY of the pump is less than a predetermined threshold value;

a step of stopping the pump and fully opening the reducing agent injection valve when it is determined that the driving DUTY of the pump is less than the threshold value, and calculating a pressure reduction amount by which a pressure value in the first reducing agent passage detected by the pressure sensor is reduced within a predetermined time; and a step of determining on the basis of the calculated pressure reduction amount whether clogging occurs in the first reducing agent passage or the second reducing agent passage.

9. The clogging determining method for the reducing agent passage according to claim 8, wherein clogging determination is performed when a temperature of $NO_x$ catalyst disposed in an exhaust passage is not less than a predetermined reference value.

* * * * *